(12) United States Patent
Hasegawa

(10) Patent No.: US 12,045,746 B2
(45) Date of Patent: Jul. 23, 2024

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventor: Hideo Hasegawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 310 days.

(21) Appl. No.: 17/496,977

(22) Filed: Oct. 8, 2021

(65) Prior Publication Data

US 2022/0122012 A1    Apr. 21, 2022

(30) Foreign Application Priority Data

Oct. 15, 2020  (JP) ................................ 2020-174204

(51) Int. Cl.
*G06Q 10/0631* (2023.01)
*B60W 40/02* (2006.01)
(Continued)

(52) U.S. Cl.
CPC ....... *G06Q 10/06311* (2013.01); *B60W 40/02* (2013.01); *B60W 40/08* (2013.01);
(Continued)

(58) Field of Classification Search
None
See application file for complete search history.

(56) References Cited

U.S. PATENT DOCUMENTS 9,813,510 B1 * 11/2017 Nickels ................. G08G 1/202
10,956,995 B1 * 3/2021 Fleischman ............ G06Q 50/14
(Continued)

FOREIGN PATENT DOCUMENTS

JP  2014-029580 A   2/2014
JP  2018-81556 A    5/2018
(Continued)

OTHER PUBLICATIONS

Hyland, Michael, and Hani S. Mahmassani. "Dynamic autonomous vehicle fleet operations: Optimization-based strategies to assign AVs to immediate traveler demand requests." Transportation Research Part C: Emerging Technologies 92 (2018): 278-297 (Year: 2018).*
(Continued)

*Primary Examiner* — Darlene Garcia-Guerra
(74) *Attorney, Agent, or Firm* — Sughrue Mion, PLLC

(57) ABSTRACT

A controller of an information processing apparatus selects a plurality of second users as targets to whom a proposal regarding provision of a predetermined service is to be made, from a plurality of first users who are potential recipients of the predetermined service. Furthermore, the controller transmits a message proposing provision of the predetermined service to apparatuses that are each associated with respective one of the plurality of second users. Furthermore, the controller determines an upper limit number of the second users to be selected, based on an acceptance probability that is a probability of the second users accepting the proposal.

16 Claims, 11 Drawing Sheets

(51) Int. Cl.
  *B60W 40/08* (2012.01)
  *B60W 50/10* (2012.01)
  *B60W 60/00* (2020.01)
  *G06N 7/01* (2023.01)
  *G08G 1/00* (2006.01)
  *H04L 67/12* (2022.01)

(52) U.S. Cl.
  CPC .......... *B60W 50/10* (2013.01); *B60W 60/001* (2020.02); *G06N 7/01* (2023.01); *G08G 1/202* (2013.01); *H04L 67/12* (2013.01); *B60W 2556/10* (2020.02)

(56) References Cited

U.S. PATENT DOCUMENTS

| | | | |
|---|---|---|---|
| 11,107,104 B1* | 8/2021 | Brannan | H04L 51/046 |
| 11,158,020 B2* | 10/2021 | Dutta | G06N 20/20 |
| 2015/0058050 A1* | 2/2015 | Tebourbi | G06Q 10/02 |
| | | | 705/5 |
| 2017/0270477 A1* | 9/2017 | Wong | G06Q 10/08 |
| 2018/0376357 A1* | 12/2018 | Tavares Coutinho | H04W 64/003 |
| 2020/0004245 A1* | 1/2020 | Rychtyckyj | B60W 10/18 |
| 2020/0058092 A1* | 2/2020 | Buttolo | G06Q 30/0281 |
| 2021/0056657 A1* | 2/2021 | Tseng | H04W 12/06 |
| 2021/0227049 A1* | 7/2021 | Demiralp | G01S 13/882 |
| 2021/0366287 A1* | 11/2021 | Lee | G06N 20/00 |
| 2021/0380126 A1* | 12/2021 | Liu | B60W 60/001 |

FOREIGN PATENT DOCUMENTS

| | | |
|---|---|---|
| JP | 2018-142289 A | 9/2018 |
| JP | 2019-200711 A | 11/2019 |

OTHER PUBLICATIONS

Iglesias, Ramon, et al. "Data-driven model predictive control of autonomous mobility-on-demand systems." 2018 IEEE international conference on robotics and automation (ICRA). IEEE, 2018 (Year: 2018).*

* cited by examiner

TERMINAL POSITION DATA

| USER ID | POSITION INFORMATION | DATE | DAY OF WEEK | TIME |
|---------|----------------------|------|-------------|------|
| U001 | STORE ID | ... | ... | ... |
| U001 | STORE ID | ... | ... | ... |
| U001 | ... | ... | ... | ... |
| U002 | STORE ID | ... | ... | ... |
| U002 | STORE ID | ... | ... | ... |
| U002 | ... | ... | ... | ... |

Fig. 3A

PROBABILITY DATA

| FACILITY ID | WEATHER | TIME SLOT | ACCEPTANCE PROBABILITY |
|---|---|---|---|
| F001 | SUNNY | ... | 50% |
| F001 | CLOUDY | ... | 60% |
| F001 | RAINY | ... | 90% |
| ... | ... | ... | ... |

Fig. 3C

| VEHICLE DATA | | | | |
|---|---|---|---|---|
| VEHICLE ID | DATE/TIME | POSITION INFORMATION | OPERATION STATE | OCCUPANCY TIME SLOT |
| V001 | ... | OPERATION HUB A | IN STANDBY | - |
| V002 | ... | LATITUDE, LONGITUDE | IN OPERATION | ... |
| V003 | ... | LATITUDE, LONGITUDE | IN OPERATION | ... |
| V004 | ... | OPERATION HUB B | IN STANDBY | - |
| ... | ... | ... | ... | ... |

Fig. 3D

| QUERY QUEUE | | |
|---|---|---|
| USER ID | USER ID | USER ID |
| DISPATCH LOCATION | DISPATCH LOCATION | DISPATCH LOCATION |
| DISPATCH TIME | DISPATCH TIME | DISPATCH TIME |
| ← NEW | | OLD → |

Fig. 5

INFORMATION PROCESSING APPARATUS, INFORMATION PROCESSING METHOD, AND NON-TRANSITORY STORAGE MEDIUM

CROSS REFERENCE TO THE RELATED APPLICATION

This application claims the benefit of Japanese Patent Application No. 2020-174204, filed on Oct. 15, 2020, which is hereby incorporated by reference herein in its entirety.

BACKGROUND

Technical Field

The present disclosure relates to a technology for supporting movement of a user.

Description of the Related Art

There are services for dispatching vehicles as appropriate in response to requests from users. For example, Patent Literature 1 discloses an application system that allows dispatch of a taxi to be requested by a simple operation.

In near future, a system for supporting movement of a user by an autonomous vehicle that is operated on demand is expected to be realized. Moreover, a technology for estimating that movement means will be needed by a user before the user expresses his/her intention, and for autonomously proposing vehicle dispatch is hoped to be put to practical use.

CITATION LIST

Patent Literature

Patent Literature 1: Japanese Patent Laid-Open 2014-029580

SUMMARY

With such a system, an operation rate of vehicles becomes an issue. For example, in the case of dispatching vehicles based on requests from users, the number of vehicles to be operated may be grasped in advance. However, in the case of autonomously proposing vehicle dispatch, whether such a proposal will be accepted or not depends on the user, and depending on the situation, there maybe vehicle that does not operate.

The present disclosure is aimed at increasing an operation rate of vehicles in a system that autonomously sends vehicles to users.

A first mode of the present disclosure is an information processing apparatus including a controller configured to select a plurality of second users as targets to whom a proposal regarding provision of a predetermined service is to be made, from a plurality of first users who are potential recipients of the predetermined service, and transmit a message proposing provision of the predetermined service to apparatuses that are each associated with respective one of the plurality of second users, where the controller determines an upper limit number of the second users to be selected, based on an acceptance probability that is a probability of the second users accepting the proposal.

Furthermore, a second mode of the present disclosure is an information processing method including selecting a selection of a plurality of second users as targets to whom a proposal regarding provision of a predetermined service is to be made, from a plurality of first users who are potential recipients of the predetermined service, transmitting a message proposing provision of the predetermined service to apparatuses that are each associated with respective one of the plurality of second users, and determining an upper limit number of the second users to be selected, based on an acceptance probability that is a probability of the second users accepting the proposal.

Furthermore, as another mode, a program for causing a computer to perform the information processing method described above, or a non-transitory computer-readable storage medium storing the program may be cited.

According to the present disclosure, an operation rate of vehicles may be increased in a system for autonomously sending vehicles to users.

BRIEF DESCRIPTION OF THE DRAWINGS

FIG. 3A is an example of terminal position data that is stored in a storage;

FIG. 3C is an example of probability data that is stored in the storage;

FIG. 3D is an example of vehicle data that is stored in the storage;

FIG. 5 is a diagram describing a query queue;

DESCRIPTION OF THE EMBODIMENTS

Figure 1:
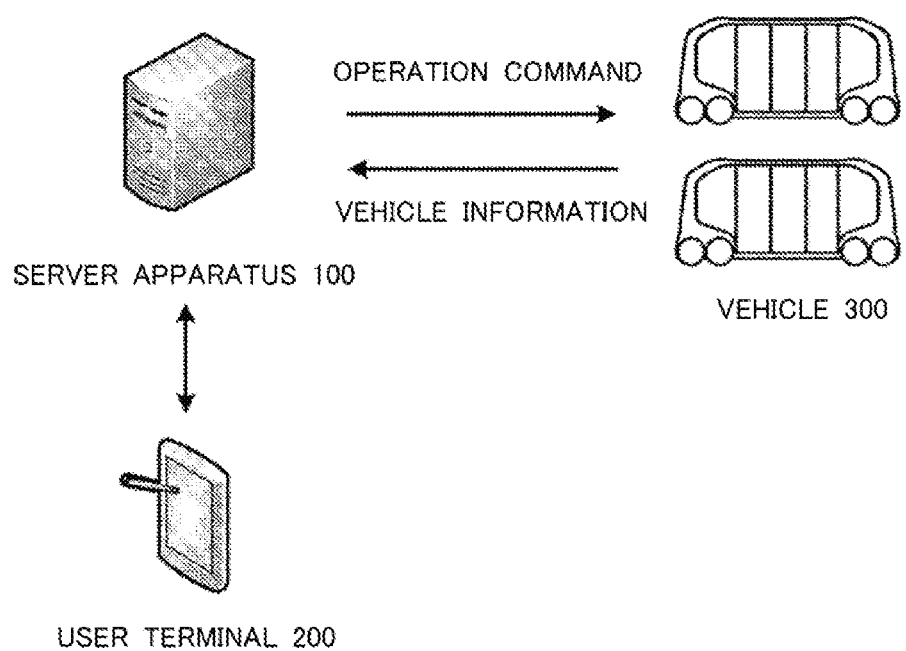
FIG. 1 is a diagram describing an outline of a vehicle dispatch system.

A technology for autonomously proposing provision of a movement service by an autonomous vehicle to a user is anticipated to be realized in the near future.

With such a system, an operation rate of vehicles becomes an issue. When considering business feasibility, it is desirable that all the vehicles being managed by the system are in operation at the same time. However, it is possible that not every user accepts the proposal, and there may be a vehicle that is not in operation. However, if, in view of such a situation, the proposal is made to a larger number of users than the number of vehicles that can be operated, there may occur a problem of overbooking.

To solve such a problem, the upper limit number of users to whom provision of the movement service is to be proposed has to be appropriately determined. This may be achieved by an information processing apparatus according to the present embodiment.

An information processing apparatus according to an aspect of the present disclosure may include a controller configured to select a plurality of second users as targets to whom a proposal regarding provision of a predetermined service is to be made, from a plurality of first users who are potential recipients of the predetermined service, and transmit a message proposing provision of the predetermined service to apparatuses that are each associated with respective one of the plurality of second users. Furthermore, the controller may determine an upper limit number of the second users to be selected, based on an acceptance probability that is a probability of the second users accepting the proposal.

The first user is a user who is a potential recipient of the predetermined service. For example, is the case where the predetermined service is a transport service by a vehicle, the first user may be a user who possibly wishes to move by the vehicle.

The second user is a user who is the target to whom provision of a service is suggested. The controller of the information processing apparatus may determine the upper limit number of the second users based on a probability (an acceptance probability) of the second users accepting provision of the service. The acceptance probability may be an average value for a plurality of second users. The operation rate may be maximized by using the acceptance probability.

Furthermore, the controller may determine the upper limit number of the second users based on a value indicating a capacity to simultaneously provide the predetermined service and the acceptance probability.

For example, the upper limit number of the second users may be calculated by multiplying an inverse number of the acceptance probability by the value indicating the capacity to simultaneously provide the service. For example, is the case where the probability of users who receive a suggestion of provision of the transport service accepting the suggestion is 80%, and there are 100 vehicles that can be simultaneously operated, provision of the transport service may be suggested to a maximum of 125 persons. With such a method, the operation rate of the service may be maximized.

Furthermore, the controller may be further configured to: acquire action data that is data about an action of a person, and specify, as the first user, a user who is estimated to start moving in a predetermined period of time, based on the action data.

That there is an indication that a certain user will move may be determined based on the action data. Provision of the transport service may thus be suggested to a user who is estimated to start moving in a predetermined period of time, for example.

Furthermore, the controller may acquire environment data that is data about a movement environment of the second user, and determine the acceptance probability based on the environment data.

The probability of a user accepting the proposal may change depending on the environment of the user (such as current position, weather, day of week, state of traffic, time slot and the like). Accordingly, more accurate estimation may be performed by determining the acceptance probability based on data about the movement environment.

The information processing apparatus may further include a storage configured to store data associating the movement environment and the acceptance probability.

Furthermore, the controller may preferentially select the first user who satisfies a predetermined condition among the plurality of first users as the second user.

Furthermore, the controller may determine a degree of priority for being selected as the second user, for each of the plurality of first users.

Furthermore, the controller may select the first user with the degree of priority that is higher than a predetermined value as the second user.

Which user among the first users is to be takes as the second user may be determined based on a predetermined condition. For example, provision of the transport service may be preferentially suggested to a user for whom use of the service is more advantageous.

Furthermore, the controller may determine the degree of priority based on a use history of the vehicle by each of the plurality of first users.

For example, in relation to a user who used the vehicle in the past, a higher use rate may be expected and the degree of priority may be increased.

Furthermore, the controller may determine the degree of priority based further on an amount of baggage associated with each of the plurality of first users.

For example, it is desirable to send the vehicle in a case where a user is carrying a large amount of baggage. The amount of baggage carried by a user may be determined based on an image obtained by capturing the user, or may be determined based on a history of payment made by the user, for example.

In the following, embodiments of the present disclosure will be described with reference to the drawings. The configurations of the embodiments below are merely examples, and the present disclosure is not limited to the configurations of the embodiments.

First Embodiment

An outline of a vehicle dispatch system according to a first embodiment will be described with reference to FIG. 1. The vehicle dispatch system according to the present embodiment includes a user terminal 200 that is a terminal carried by a user, an autonomous vehicle that provides a transport service (hereinafter "vehicle 300"), and a server apparatus 100 that controls the vehicle 300.

The user terminal 200 is a mobile terminal that is carried by a user. The user terminal 200 periodically transmits data about an action of the user to the server apparatus 100. In the present embodiment, the user terminal 200 transmits data indicating the position of the subject terminal as the data about the action of the user.

The vehicle 300 is an autonomous vehicle that is capable of traveling while carrying a user. The vehicle 300 is capable of unmanned traveling according to a command transmitted from the server apparatus 100. Furthermore, the vehicle 300 may allow a user to get on or off en route. A plurality of vehicles 300 may be included in the system.

The server apparatus 100 is an apparatus that controls the vehicle 300. Furthermore, the server apparatus 100 estimates, based on position information received from the user terminal 200, that the user will start moving in a predetermined period of time (that is, detects an indication of movement), and suggests provision of the transport service by the vehicle 300 to the user based on a result of the estimation. When accepted by the user, the server apparatus 100 sends the vehicle 300 to the user. Means of transport may thus be autonomously provided to the user who needs means of movement.

In the case where there is a plurality of users who are giving the indication of movement, to how many of them provision of the transport service is to be suggested becomes an issue. For example, in the case where there is a certain number of users who would reject the suggestion, the operation rate of vehicles is increased when the suggestion is made to a larger number of users than the number of vehicles that are available. However, if the number of users to whom the suggestion is to be made is overly increased, there may occur a problem of overbooking. That is, a situation may arise where a vehicle cannot be assigned even though a user wishes for provision of the transport service.

In the present embodiment, to cope with such a situation, the server apparatus 100 determines in real-time, according to the situation, the upper limit number of users to whom provision of the transport service is to be suggested.

The present embodiment illustrates a mode in which the server apparatus 100 detects an indication of a user who is in a predetermined commercial facility leaving for home, and sends the vehicle 300 to the user according to a predicted departure time (a time when the user is to start leaving for home).

Figure 2:
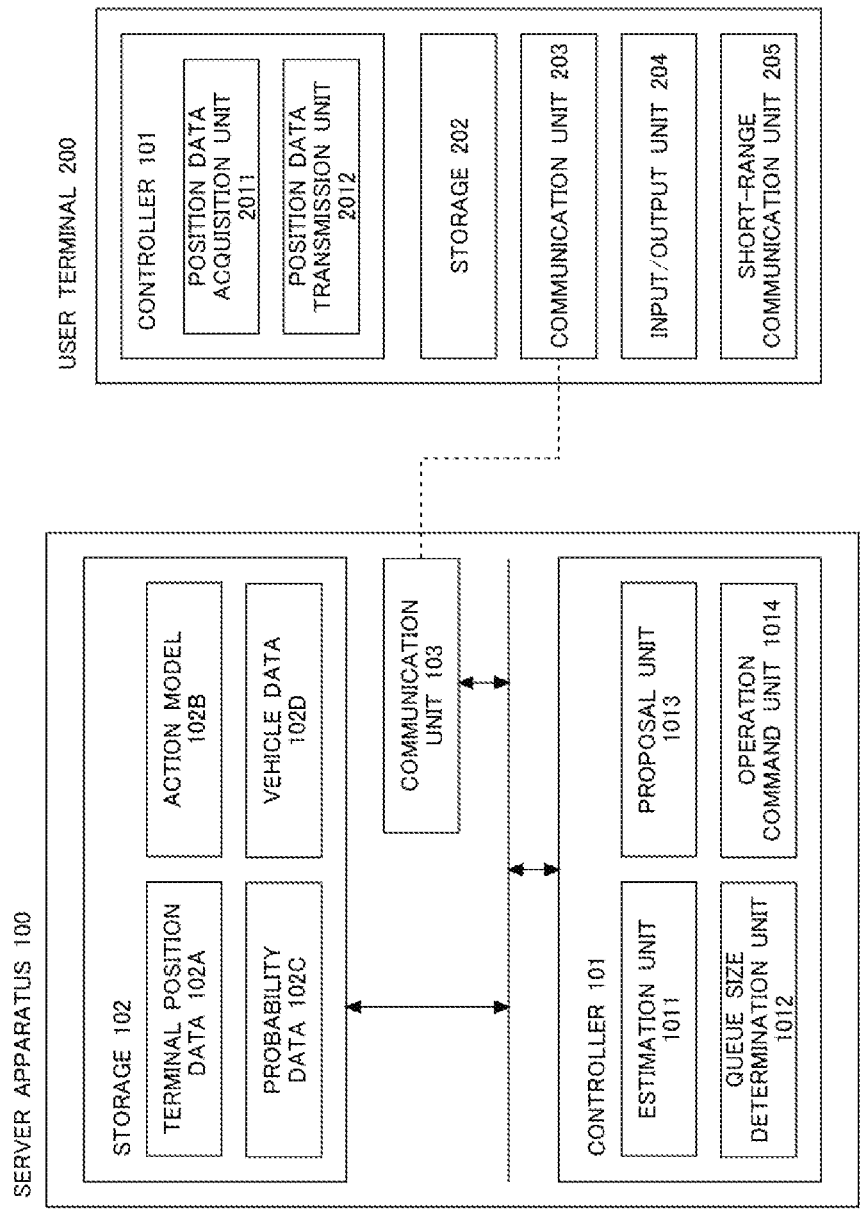
FIG. 2 is a diagram illustrating in greater detail structural elements of the vehicle dispatch system.

FIG. 2 is a diagram illustrating in greater detail the structural elements of the vehicle dispatch system according to the present embodiment.

First, a description will be given of the user terminal 200.

For example, the user terminal 200 is a small computer such as a smartphone, a mobile phone, a tablet terminal, a personal digital assistant, a laptop computer, or a wearable computer (such as a smartwatch). The user terminal 200 includes a controller 201, a storage 202, a communication unit 203, an input/output unit 204, and a short-range communication unit 205.

The controller 201 is an arithmetic device that is in charge of control that is performed by the user terminal 200. The controller 201 may be implemented by an arithmetic processing device such as a central processing unit (CPU).

The controller 201 includes two functional modules, namely, a position data acquisition unit 2011 and a position data transmission unit 2012. These functional modules may be implemented by the CPU executing programs that are stored in the storage 202 described later.

The position data acquisition unit 2011 acquires data (hereinafter "position data") about a position of the subject terminal. The position data may he expressed in latitude and longitude, for example, and in the present embodiment, it is data indicating a position in a target commercial facility.

For example, in the case where a plurality of beacons are installed inside a commercial facility, the position data acquisition unit 2011 may communicate with the beacons through the short-range communication unit 205 described later and acquire identifiers thereof. In this case, the identifier of a beacon is taken as the data about the position of the subject terminal. The system may thus grasp at which location (for example, in which store) in the facility the user is.

The position data transmission unit 2012 periodically transmits the position data acquired by the position data acquisition unit 2011 to the server apparatus 100.

The storage 202 includes a main memory and an auxiliary memory. The main memory is a memory where programs to be executed by the controller 201, and data to be used by the control programs are developed. The auxiliary memory is a device that stores the programs to be executed by the controller 201, and the data to be used by the control programs. The auxiliary memory may store the programs to be executed by the controller 201 in the form of packaged applications. An operating system for executing the applications may also be stored. Processes described later are performed by the programs stored in the auxiliary memory being loaded into the main memory and being executed by the controller 201.

The main memory may include a random access memory (RAM) and a read only memory (ROM). Furthermore, the auxiliary memory may include an erasable programmable ROM (EPROM) and a hard disk drive (HDD). The auxiliary memory may further include a removable medium, or in other words, a removable recording medium. The removal medium is a universal serial bus (USB) memory or a disk recording medium such as a compact disc (CD) or a digital versatile disc (DVD), for example.

The communication unit 203 is a wireless communication interface for connecting the user terminal 200 to a network. For example, the communication unit 203 is capable of communicating with the server apparatus 100 by a wireless LAN or a mobile communication service such as 3G, LTE or 5G for example.

The input/output unit 204 is a unit that receives an input operation performed by a user, and that presents information to the user, and is, in the present embodiment, one touch panel display, or in other words, a liquid crystal display and control means thereof, or a touch panel and control means thereof.

The short-range communication unit 205 is an interface for performing short-range wireless communication with the beacon that is installed in the facility. The short-range communication unit 205 performs communication within a short range (about several meters) using a predetermined wireless communication standard.

In the present embodiment, the short-range communication unit 205 performs data communication by Bluetooth (registered trademark) Low Energy standard (hereinafter "BLE"). The present embodiment cites BLE as an example, but other wireless communication standards may also be used. For example, near field communication (NFC), ultra-wideband (UWB, Wi-Fi (registered trademark) and the like may also be used.

Next, a description will be given of the server apparatus 100.

The server apparatus 100 stores a model (hereinafter "action model") indicating a typical action that may be takes by a user, and determines whether there is an indication of a user carrying the user terminal 200 leaving for home, based on the position data received from the user terminal 200.

Furthermore, the server apparatus 100 queries about whether the transport service by the vehicle 300 should be provided, with the user giving the indication of leaving for home as a target. At this time, to maximize the operation efficiency of the vehicle, the server apparatus 100 determines, as appropriate, the maximum number of users who are to be queried.

A specific method will be described later.

The server apparatus 100 may be a general-purpose computer. That is, the server apparatus 100 may be a computer that includes processors such as a CPU, a GPU and the like, main memories such as a RAM, a ROM and the like, and auxiliary memories such as an EPROM, a hard disk drive, a removable medium and the like. The removable medium may be a USB memory or a disk recording medium such as a CD or a DVD, for example. The auxiliary memory stores an operating system (OS), various programs, various tables and the like, and each function matching a predetermined object as described later may be implemented by controlling each structural unit or the like through execution of a program stored in the auxiliary memory, by loading the program into a work area of the main memory and executing the same. However, the functions may be partially or wholly implemented by a hardware circuit such as an ASIC or an FPGA.

A controller 101 is an arithmetic device that is in charge of control that is performed by the server apparatus 100. The controller 101 may be implemented by an arithmetic processing device such as a CPU.

The controller 101 includes four functional modules, namely, an estimation unit 1011, a queue size determination unit 1012, a proposal unit 1013, and an operation command unit 1014. Each functional module may be implemented by the CPU executing a program that is stored.

The estimation unit 1011 acquires the position data from the user terminal 200, and determines that there is the indication of the user leaving for home, based on the acquired position data. This determination may be performed by using the position data that is stored in a storage 102 described later and the action model of each user (both will be described in detail later). In the case where there is a user for whom the indication of leaving for home is detected, the estimation unit 1011 stores information (hereinafter "movement data") about movement of the user in a queue (hereinafter "query queue"). The server apparatus 100 queries (suggests) the user about whether the transport service should be provided, based on the movement data that is stored in the query queue.

The queue size determination unit 1012 adjusts the size of the query queue based on the probability (hereinafter "acceptance probability") of the users accepting suggestion of provision of the transport service. The size of the query queue indicates the number of users who are to be queried at the same time about whether the transport service should be provided. That is, in the case where the acceptance probability is low, the queue size determination unit 1012 increases the size of the query queue such that a larger number of users may be queried. By contrast, in the case where the acceptance probability is high, the queue size determination unit 1012 reduces the size of the query queue and narrows down the number of users who are to be queried.

The proposal unit 1013 suggests provision of the transport service by the vehicle 300 to a user based on the movement data that is stored in the query queue. In the case where the user expresses an intention to get on the vehicle 300, the movement data corresponding to the user is transmitted to the operation command unit 1014 described later.

The operation command unit 1014 generates a command (an operation command) for transporting the user, based on the movement data that is received, and transmits the same to a target vehicle. The operation command includes information about a travel route, points where the user is to get on and off, an identifier of the user who is to get on and off, and the like.

Furthermore, the operation command unit 1014 includes a function of managing the vehicles 300 included in the system. The operation command unit 1014 periodically communicates with the plurality of vehicles 300 included in the system to thereby acquire, in relation to each vehicle, a current position, a state, a task that is currently executed, an occupancy time and the like, and stores these pieces of data as the vehicle data. The vehicle to be sent to a specific user may be determined by referring to the vehicle data that is stored.

The storage 102 includes a main memory and an auxiliary memory. The main memory is a memory where programs to be executed by the controller 101, and data to be used by the control programs are developed. The auxiliary memory is a device that stores the programs to be executed by the controller 101, and the data to be used by the control programs.

The storage 102 stores, as terminal position data 102A, the position data that is periodically collected from the user terminal 200. FIG. 1A is an example of the terminal position data. As illustrated in the drawing, the terminal position data includes pieces of information such as the identifier of a user (a user ID), the position information (a store ID), date, day of week, and time.

Furthermore, the storage 102 stores the action model (an action model 102B) of each user. The action model in the present embodiment is a model defining, by transition of the position, possible actions of a user until the user starts to leave for home.

Figure 3B:
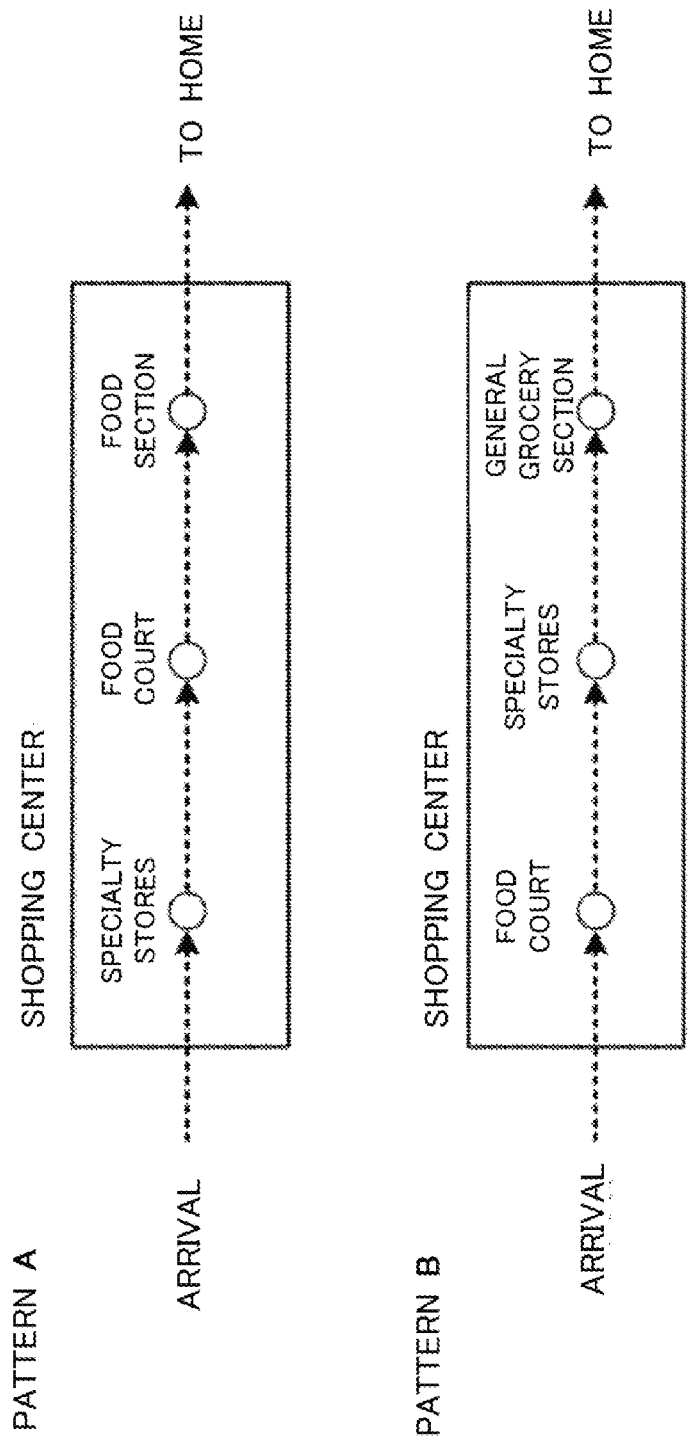
FIG. 3B is an example of an action model that is stored in the storage.

For example, as illustrated in FIG. 3B, typical actions from arriving at a store in a commercial facility until leaving the store may be different depending on the user. For example, in the case where there is a user who adopts an action pattern as indicated by pattern A, and the user moves to a food section, it can be assumed that the user will leave for home in a short time. Furthermore, in the case where there is a user who adopts an action pattern as indicated by pattern B, and the user moves to a general grocery section, it can be assumed that the user will leave for home in a short time. In this manner, in the present embodiment, the action model stores information for estimating a timing when a user starts to leave for home. The action model corresponding to a user is stored in the storage 102 in advance. For example, the action model 102B may be generated based on a history of the position data that is acquired from the user terminal 200 carried by the user.

The storage 102 also stores data (probability data 102C) for calculating the probability (the acceptance probability) of users to whom provision of the transport service is suggested accepting the suggestion.

For example, the probability data 102C may be a table describing the acceptance probability for each environment (hereinafter "movement environment") of the user. FIG. 3C is an example of the probability data 102C. In the present example, the acceptance probability is associated with a facility ID (an identifier of a target commercial facility), weather, and a time slot. In the case of the present example, the acceptance probability may be obtained with the target commercial facility, the weather, and the time slot as keys.

The present example illustrates the location, the weather, and the time slot as elements indicating the movement environment, but other elements may also be used.

Moreover, the probability data 102C may be a machine learning model or the like that takes data about the movement environment of a user as an input, and the acceptance probability as an output.

A method of using the acceptance probability will be described in detail later.

Furthermore, the storage 102 stores data (vehicle data 102D) for managing the plurality of vehicles 300. FIG. 3D is an example of the vehicle data. The vehicle data is data describing an identifier of the vehicle 300 that is managed by the system, and the position information, an operation state, an occupancy time slot or the like of the vehicle. Additionally, the vehicle data may also include information other than those mentioned above. For example, an intended use/type of the vehicle 300, information about a standby position (garage or business premises), and pieces of information about a vehicle body size, a payload (a seating capacity), a distance to empty when fully charged, the distance to empty at a current time point, a route point, a travel route, a destination and the like may be included.

The vehicle data 102D is periodically updated based on information (hereinafter "vehicle information") that is transmitted from the vehicle 300.

A communication unit 103 is a communication interface for connecting the server apparatus 100 to a network. For example, the communication unit 103 includes a network interface board, and a wireless communication circuit for wireless communication.

The configurations illustrated in FIG. 2 are only examples, and the illustrated functions may be partially or wholly performed by a dedicated circuit. Furthermore, programs may be stored and executed by a combination of main memory and auxiliary memory other than those illustrated.

Figure 4:
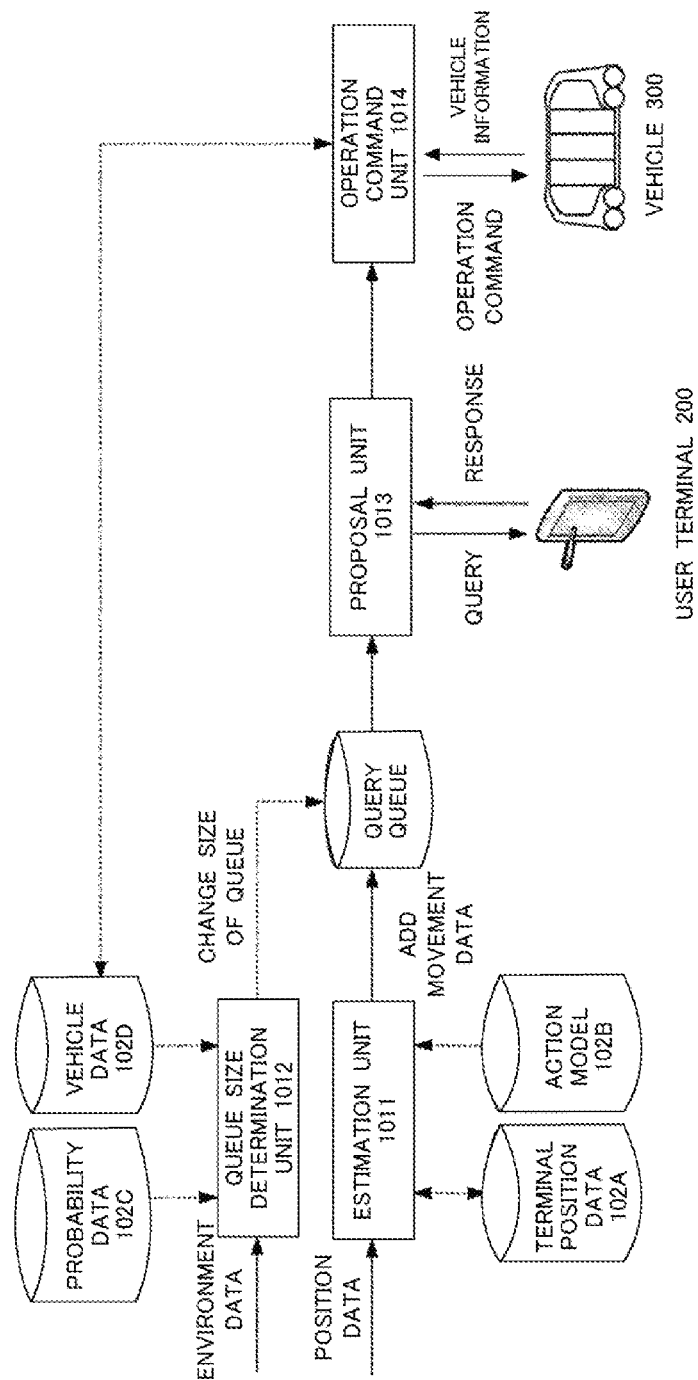
FIG. 4 is a data flow diagram for functional modules of a controller.

Lest, a process that is performed by the controller 101 will be described with reference to FIG. 4 that is a diagram illustrating data that is transmitted/received between the modules.

The estimation unit 1011 receives the position data from a plurality of user terminals 200, and accumulates the received position data in the storage 102 as the terminal position data 102A. Furthermore, the estimation unit 1011 determines that there is an indication that a user is leaving for home, by comparing the accumulated position data and the action model stored in the storage 102. For example, in the case where a change in the position matches a pattern defined by the action model, the user may be estimated to start leaving for home in the near future.

In the case where the user is determined to start leaving for home in the near future, the estimation unit 1011 generates the movement data. The movement data is data including the identifier of the user who is to be picked up by the vehicle 300, point and time of picking up the user, a point where the user is to get off, and the like.

For example, in the case where the user is determined to start leaving for home in 30 minutes, the estimation unit 1011 generates the movement data indicating that the user is to be picked up 30 minutes later at an entrance of the commercial facility. The movement data that is generated is added to a query queue as illustrated in FIG. 5.

In the case where the estimation unit 1011 is able to determine certainty (hereinafter "certainty of movement") of the user starting to move (leave for home) as estimated, the movement data may be generated in the case where the certainty of movement exceeds a predetermined value.

For its part, the queue size determination unit 1012 changes the size of the query queue in real-time, independently of the process by the estimation unit 1011. The size of the query queue may be determined based on the acceptance probability described above. For example, in the case where there are 100 vehicles that are currently available, and the acceptance probability is 50%, the suggestion of vehicle dispatch may be made to a maximum of 200 users.

The acceptance probability greatly depends on the movement environment described above. For example, the acceptance probability increases in the case of poor weather compared with good weather.

The queue size determination unit 1012 calculates an acceptance probability p based on data (the environment data) about the movement environment of the user and the probability data that is stored. The environment data may be acquired from outside the apparatus.

In the case where the probability data is a table or a database, the queue size determination unit 1012 may retrieve the acceptance probability with a plurality of items included in the environment data as keys.

Furthermore, in the case where the probability data is a machine learning model, the queue size determination unit 1012 may transform a plurality of items included in the environment data into features and input the same to the model, and may acquire the acceptance probability that is output.

Furthermore, the queue size determination unit 1012 refers to the vehicle data 102D, and acquires the number v of vehicles 300 that are currently available. Then, a value is obtained by multiplying an inverse number of the acceptance probability by the number of vehicles 300, and a maximum number n of persons to whom queries can be transmitted is obtained. The "n" is the size of the query queue.

$$n = v \times (1/p) \qquad \text{Equation (1)}$$

For example, in the case where the number of vehicles 300 that are available is 100, and the acceptance probability calculated based on the movement environment is 67%, n is 150. In this case, the movement data for 150 persons can be stored in the query queue (in other words, the queries may be simultaneously transmitted to 150 persons).

The proposal unit 1013 acquires, every predetermined period of time, the movement data that is stored in the query queue, and transmits the query to the corresponding user terminal 200. In the case where there is a response from the user, or the query is timed out, the movement data corresponding to the user is removed from the query queue. In the case where there is a user who accepts the suggestion, the corresponding movement data is transmitted to the operation command unit 1014.

The operation command unit 1014 determines the vehicle 300 to be assigned to the user, based on the movement data that is acquired. The vehicle to be assigned to the user may be determined by referring to the vehicle data 102D. Then, an operation command is transmitted to the determined vehicle.

The operation command includes information for identifying the user, a time when the user is to be picked up (a vehicle dispatch time), a point where the user is to get on (a vehicle dispatch point), a point where the user is to get off (for example, home of the user), and the like.

The vehicle 300 receiving the operation command travels according to the operation command and transports the user.

Furthermore, the operation command unit 1014 performs a process of managing the plurality of vehicles 300, that is, a process of collecting information (the vehicle information) about the state of each vehicle by periodically communicating with the plurality of vehicles 300, and of updating the vehicle data 102D.

Figure 6:
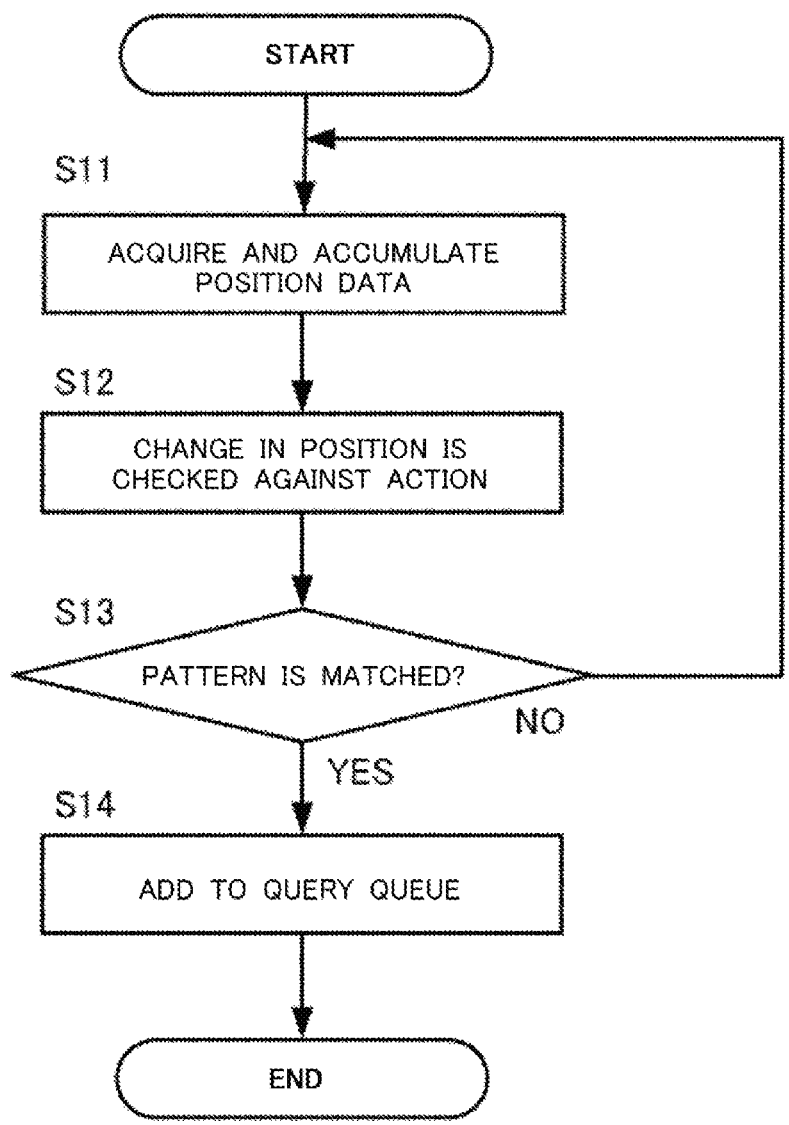
FIG. 6 is a flowchart of a process that is performed by a controller in a first embodiment.
Figure 7:
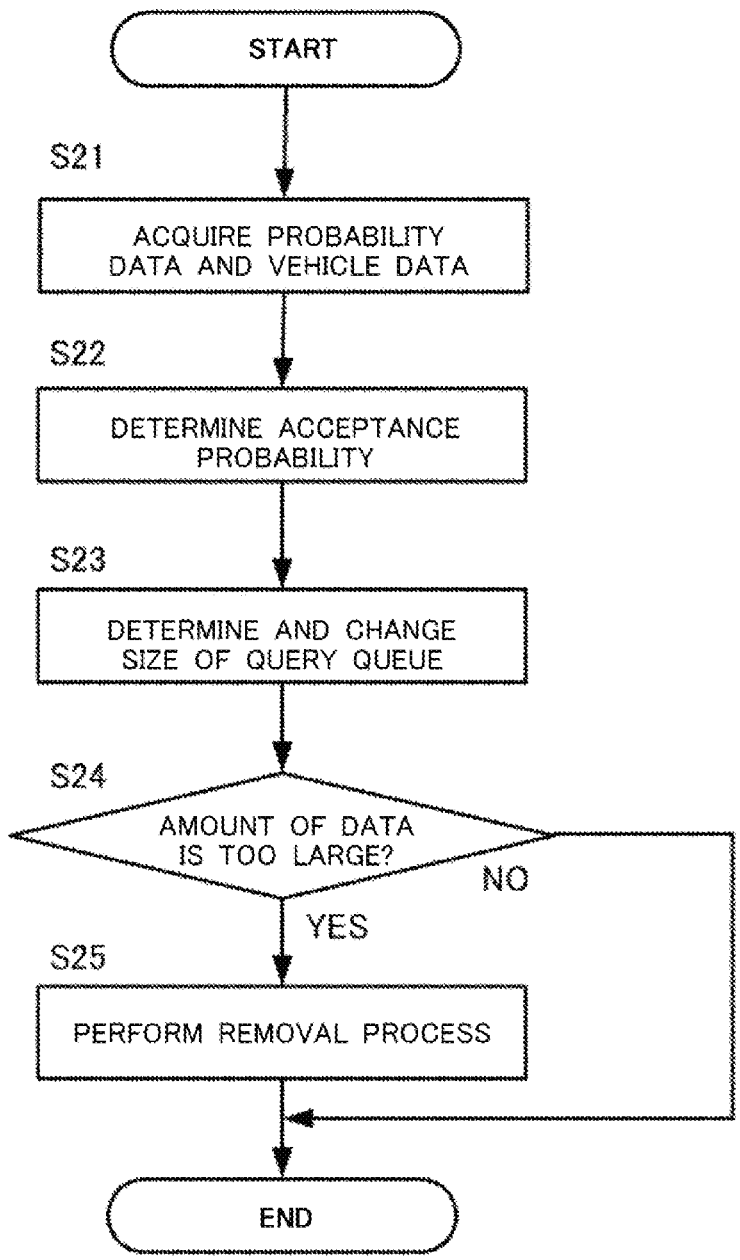
FIG. 7 is a flowchart of a process that is performed by the controller in the first embodiment.
Figure 8:
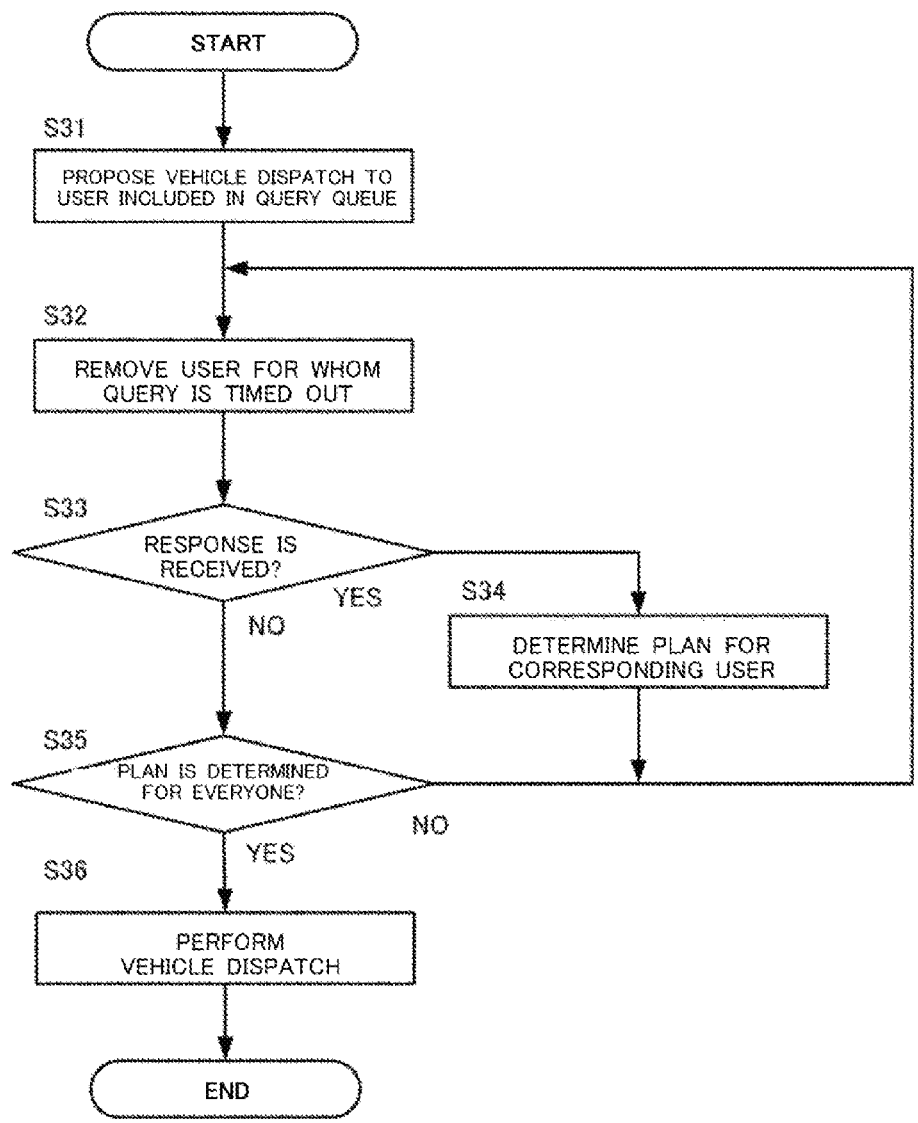
FIG. 8 is a flowchart of a process that is performed by the controller in the first embodiment.

FIGS. 6 to 8 are flowcharts illustrating processes that are performed by the server apparatus 100.

The process performed by the operation command unit 1014 to collect the vehicle information and update the vehicle data 102D is assumed to be performed in parallel with and independently of the illustrated processes.

The flowchart illustrated in FIG. 6 indicates a process performed by the estimation unit 1011 to receive and accumulate the position data from the user terminal 200.

First, in step S11, the position data is received from the user terminal 200, and is accumulated in the storage 102 as the terminal position data 102A.

Next, in step S12, a set of accumulated position data is checked against the action model corresponding to a user, and whether there is a user who is giving as indication of leaving for home is determined. For example, in the case where a degree of match between the transition of the position and the action pattern defined by the action model is greater than a threshold, it can be determined that there is an indication of leaving for home. In the case where the pattern is matched (step S13: Yes), the process proceeds to step S14. In the case where the pattern is not matched (step S13: No), the process returns to step S11.

In step S14, the estimation unit 1011 generates the movement data of a corresponding user, and adds the movement data to the query queue.

Here, in the case where there is no space in the query queue, and the movement data cannot be added, processing may be performed by one of the following methods.

(Method A) The target movement data is not added to the queue.

(Method B) A different piece of movement data with the oldest time of addition to the queue is removed from the queue.

(Method C) The degree of priority is determined for the movement data, and a different piece of movement data with a lower degree of priority is removed from the queue.

The degree of priority of the movement data may be determined according to the following criteria, for example.

(1) The degree of priority is determined based on the number of times of use or the frequency of use of the transport service by the user in the past.

For example, information indicating a use history about the transport service is stored in the storage 102, and a value indicating the number of times of use or the frequency of use in a predetermined period of time in the past is taken as the degree of priority.

(2) A value indicating the number of times or the frequency of the user responding to the suggestion of provision of the transport service.

For example, pieces of information indicating the number of times a user to whom provision of the transport service was suggested responded to the suggestion, the number of times of acceptance of the suggestion, a round-trip time until the response and the like in a predetermined period of time in the past ate stored in the storage 102, and values indicating those mentioned above are taken as the degree of priority.

(3) A value indicating the certainty of movement of the user.

For example, in the case where the estimation unit 1011 is capable of determining the certainty of movement of a user, a value indicating the certainty of movement is taken as the degree of priority.

When the degree of priority is increased, the probability of being stored in the query queue is increased, and the user is more likely to be selected as the target user to whom provision of the transport service is to be suggested.

Additionally, values other than those mentioned above may also be used as the degree of priority.

Furthermore, the degree of priority may be corrected according to the state of the user. For example, the degree of priority may be increased the larger the amount of baggage carried by the user, or the degree of priority may be increased the larger the number of persons (such as family members) accompanying the user. The amount of baggage carried by the user may be determined based on a result of performing sensing of the user, or may be determined based on payment information or the like associated with the user. Moreover, the number of persons accompanying the user may be acquired based on the transport means used on the way in. For example, in the case where the user used the transport service on the way in, the number of persons accompanying the user may be determined based on the number of persons who were on board on the way in, or the like.

The flowchart illustrated in FIG. 7 indicates a process that is performed by the queue size determination unit 1012 to adjust the size of the query queue. As described above, the process illustrated in FIG. 7 is performed every predetermined period of time (such as every 15 minutes), independently of the process illustrated in FIG. 6.

First, in step S21, the probability data 102C and the vehicle data 102D stored in the storage 102 are acquired.

Then, in step S22, the environment data is acquired, and the acceptance probability is determined based on the environment data and the probability data 102C. For example, in the case of the example in FIG. 3C, the acceptance probability may be acquired based on the target commercial facility, the weather, and the time slot. In the case where the probability data 102C is a machine learning model, a movement condition is transformed into a feature and is taken as an input, and the acceptance probability that is output is acquired.

Next, in step S23, the size of the query queue is changed according to Equation (1), based on the acceptance probability that is determined and the number of vehicles that are available. The number of vehicles that are available may be acquired by referring to the vehicle data 102D.

Here, in the case where the amount of data becomes too large due to the change in the size of the query queue (step S24: Yes), the process proceeds to step S25, and the movement data as a removal target is determined. Provision of the transport service is not suggested to a user who is made the removal target. The removal target may be determined by one of (Method A) to (Method C) described above, for example. In the case where the amount of data does not become too large even when the size of the query queue is changed (step S24: No), the process is ended.

FIG. 8 is a flowchart of a process that is performed by the proposal unit 1013 to suggest provision of the transport service to a user included in the query queue. The process illustrated in FIG. 8 is performed every predetermined period of time.

First, in step S31, every piece of movement data included in the query queue is processed, and a message suggesting provision of the transport service is transmitted to the user terminals 200 carried by corresponding users.

Next, in step S32, the movement data corresponding to a user from whom a response is not received within a certain period of time (such as five minutes) is removed from the queue.

Next, in step S33, it is determined whether a response is obtained from any of the users. In the case where there is a response, a vehicle dispatch plan (whether to dispatch a vehicle or not) for the user is determined in step S34. In the case where there is no response, the process proceeds to step S35.

In step S35, whether or not the vehicle dispatch plan is determined for all the users who were queried is determined. In the case where a negative determination is made in the present step, the process returns to step S32.

In the case where the vehicle dispatch plan is determined for all the users who were queried, the process proceeds to step S36, and the movement data corresponding to a user who wishes a vehicle to be dispatch is transferred to the operation command unit 1014.

The operation command unit 1014 performs assignment of the vehicles 300 based on the acquired movement data, and generates an operation command for each vehicle. The operation command is transmitted to respective one of the vehicles 300, and operation is thereby started.

As described above, the server apparatus 100 according to the first embodiment detects an indication of a user starting to move (to leave for home), based on information received from the user terminal 200, and autonomously suggests provision of the transport service. Furthermore, the number of users to whom the suggestion is to be made is dynamically adjusted based on the acceptance probability. The operation rate of vehicles may thereby be maximized.

Second Embodiment

In the first embodiment, pieces of the movement data corresponding to all the users who are giving an indication of movement are added to the query queue, but alternatively, only the movement data corresponding to a user who satisfies a predetermined condition may be added to the query queue. As the predetermined condition, a use record of the transport service, the number of accompanying persons, the amount of baggage carried by the user, or the like may be used, for example.

Furthermore, as indicated by (Method C) in the first embodiment, the degree of priority may be determined for each user, and only the movement data corresponding to a user for whom the degree of priority satisfies a threshold may be added to the query queue. For example, the degree of priority may be determined based on the use record of the transport service, or may be determined based on the number of accompanying persons, the amount of baggage carried by the user, or the certainty of movement.

Furthermore, the threshold for the degree of priority may be dynamically changed based on the operation state of the vehicles and the like.

For example, in the case where the number of users who are giving the indication of moving is small, and the operation rate of the vehicles is low, the threshold for the degree of priority may be lowered to take a larger number of users into the queue. By contrast, in the case where the number of users who are giving the indication of moving is large, and a state where the operation rate of the vehicles is close to 100% continues, the threshold for the degree of priority may be raised, and vehicles may be preferentially assigned to users for whom use of the transport service is more advantageous.

(Modifications)

The embodiments described above are merely examples, and the present disclosure may be changed as appropriate within the scope of the disclosure.

For example, processes and means described in the present disclosure may be freely combined to the extent that no technical conflict exists.

Furthermore, in the description of the embodiments, an indication of a user who is in a commercial facility leaving for home is detected, but the place of stay of the user is not limited to commercial facilities and the target action is not limited to departure for home as long as start of movement of the user may be estimated. For example, an indication of a user leaving home may be detected based on an action of the user who is at home.

Furthermore, in the description of the embodiments, an example is cited where the server apparatus 100 is in charge of a predetermined commercial facility, but the server apparatus 100 does not have to perform management on a per-facility basis. For example, the server apparatus 100 may manage vehicles that can be sent to a predetermined area, and an indication of movement may be determined for users who are in the area. In this case, that a user will start moving (for example, start leaving for home) in the near future may be determined based on information transmitted from the user terminal 200 that is positioned in the area.

The predetermined area may be a section of a mesh, or may be defined by an administrative division or the like.

Furthermore, the server apparatus 100 may manage a plurality of areas. In this case, vehicle dispatch may be suggested by the method described above by acquiring, on a per-area basis, the number of vehicles that are available and the upper limit number of users to whom the suggestion is to be made. The probability data 102C may be defined on a per-area basis.

Furthermore, in the description of the embodiments, start of movement of a user is estimated based on the corresponding position information, but other pieces of data may also be used. For example, that a user will start moving in the near future may be determined based on information, transmitted from the user terminal 200 carried by the user, other than the position information (such as information about electronic payment, a message, an e-mail or the like), or based on data that is obtained by performing sensing of the user.

Furthermore, a process that is described to be performed by one apparatus may be shared and performed by a plurality of apparatuses. Processes described to be performed by different apparatuses may be performed by one apparatus. Which function is to be implemented by which hardware configuration (server configuration) in a computer system may be flexibly changed.

The present disclosure may also be implemented by supplying computer programs for implementing the functions described in the embodiments described above to a computer, and by one or more processors of the computer reading out and executing the programs. Such computer programs may be provided to the computer by a non-transitory computer-readable storage medium that can be connected to a system bus of the computer, or may be provided to the computer through a network. The non-transitory computer-readable storage medium may be any type of disk including magnetic disks (floppy (registered trademark) disks, hard disk drives (HDDs), etc.) and optical disks (CD-ROMs, DVD discs, Blu-ray discs, etc.), and any type of medium suitable for storing electronic instructions, such as read-only memories (ROM), random access memories (RAMs), EPROMs, EEPROMs, magnetic cards, flash memories, or optical cards.

What is claimed is:

1. An information processing apparatus comprising:
   a storage; and
   a controller communicatively coupled to the storage, wherein the controller is configured to:
   select, from a plurality of first users who are potential recipients of a predetermined service, a plurality of second users as targets to whom a proposal regarding provision of the predetermined service is to be made;
   transmit a message proposing provision of the predetermined service to apparatuses associated with each of the plurality of second users;
   receive a response to the transmitted message from at least one of the apparatuses associated with the plurality of second users;
   wherein the predetermined service is a transport service by an autonomous vehicle,
   wherein the plurality of first users are users who wish to move by the autonomous vehicle,
   wherein the storage stores an action model corresponding to each of the plurality of first users defining, by transition of position, possible actions of a user until the user starts to leave for home from a predetermined facility, and wherein the controller is further configured to:
acquire position data indicating a position of a user apparatus from each of the user apparatuses owned by each of the plurality of first users;
check the acquired position data against each of the stored action model corresponding to each of the plurality of first users;
determine whether a degree of match between the transition of the position of each of the plurality of first users and an action pattern of each of the plurality of first users defined by the stored action model is greater than a threshold;
estimate each of a plurality of third users owning each of the user apparatuses transmitted the checked position data to start moving in a predetermined period of time in a case where the degree of match is greater than the threshold;
specify the estimated plurality of third users, as the plurality of first users;
determine an upper limit number of the plurality of second users to be selected, based on an acceptance probability that is a probability of the plurality of second users accepting the proposal;
assign autonomous vehicles to respective users of the plurality of second users associated with the at least one of the apparatuses that transmitted the response to the transmitted message;
generate an operation command for each of the assigned autonomous vehicles;
transmit the generated operation command to each of the assigned autonomous vehicles; and
control an operation of each of the assigned autonomous vehicles.

2. The information processing apparatus according to claim 1, wherein the controller is further configured to:
determine the upper limit number of the plurality of second users based on a value indicating a capacity to simultaneously provide the predetermined service and the acceptance probability.

3. The information processing apparatus according to claim 1, wherein the controller is further configured to:
acquire environment data, wherein the environment data is data about a movement environment of the plurality of second users, and
determine the acceptance probability based on the environment data.

4. The information processing apparatus according to claim 3, further comprising:
a second storage configured to store data associating the movement environment and the acceptance probability.

5. The information processing apparatus according to claim 1, wherein the controller is further configured to:
preferentially select users that satisfy a predetermined condition from among the plurality of first users as the plurality of second users.

6. The information processing apparatus according to claim 1, wherein the controller is further configured to:
determine a degree of priority for being selected as the plurality of second users, for each of the plurality of first users.

7. The information processing apparatus according to claim 6, wherein the controller is further configured to:
determine the degree of priority based on a use history of the autonomous vehicle by each of the plurality of first users.

8. The information processing apparatus according to claim 7, wherein the controller is further configured to:
determine the degree of priority based further on an amount of baggage associated with each of the plurality of first users.

9. The information processing apparatus according to claim 6, wherein the controller is further configured to:
select the plurality of first users with the degree of priority that is higher than a predetermined value as the plurality of second users.

10. An information processing method executed by a computer, the information processing method comprising:
selecting, from a plurality of first users who are potential recipients of a predetermined service, a plurality of second users as targets to whom a proposal regarding provision of the predetermined service is to be made;
transmitting a message proposing provision of the predetermined service to apparatuses-associated with each of the plurality of second users;
receiving a response to the transmitted message from at least one of the apparatuses associated with the plurality of second users;
wherein the predetermined service is a transport service by an autonomous vehicle,
wherein the plurality of first users are users who wish to move by the autonomous vehicle, and
wherein the information processing method further comprises:
storing an action model corresponding to each of the plurality of first users defining, by transition of position, possible actions of a user until the user starts to leave for home from a predetermined facility;
acquiring position data indicating a position of a user apparatus from each of the user apparatuses owned by each of the plurality of first users;
checking the acquired position data against each of the stored action model corresponding to each of the plurality of first users;
determining whether a degree of match between the transition of the position of each of the plurality of first users and an action pattern of each of the plurality of first users defined by the stored action model is greater than a threshold;
estimating each of a plurality of third users owning each of the user apparatuses transmitted the checked position data to start moving in a predetermined period of time in a case where the degree of match is greater than the threshold;
specifying the estimated plurality of third users, as the plurality of first users;
determining an upper limit number of the plurality of second users to be selected, based on an acceptance probability that is a probability of the plurality of second users accepting the proposal;
assigning autonomous vehicles to respective users of the plurality of second users associated with the at least one of the apparatuses that transmitted the response to the transmitted message;
generating an operation command for each of the assigned autonomous vehicles;
transmitting the generated operation command to each of the assigned autonomous vehicles; and
controlling an operation of each of the assigned autonomous vehicles.

11. The information processing method according to claim 10, further comprising:

determining the upper limit number of the plurality of second users based on a value indicating a capacity to simultaneously provide the predetermined service and the acceptance probability.

12. The information processing method according to claim 10, further comprising:
    acquiring environment data, wherein the environment data is data about a movement environment of the plurality of second users; and
    determining the acceptance probability based on the environment data.

13. The information processing method according to claim 12, further comprising:
    acquiring data associating the movement environment and the acceptance probability.

14. The information processing method according to claim 10, further comprising:
    determining a degree of priority for being selected as the plurality of second users, for each of the plurality of first users.

15. The information processing method according to claim 14, further comprising:
    selecting the plurality of first users with respective degrees of priority that are higher than a predetermined value as the plurality of second users.

16. A non-transitory storage medium storing a program for causing a computer to:
    select, from a plurality of first users who are potential recipients of a predetermined service, a plurality of second users as targets to whom a proposal regarding provision of the predetermined service is to be made;
    transmit a message proposing provision of the predetermined service to apparatuses associated with each of the plurality of second users;
    receive a response to the transmitted message from at least one of the apparatuses associated with the plurality of second users;
    wherein the predetermined service is a transport service by an autonomous vehicle,
    wherein the plurality of first users are users who wish to move by the autonomous vehicle, and
    wherein the program further causes the computer to:
        store an action model defining, corresponding to each of the plurality of first users, by transition of position, possible actions of a user until the user starts to leave for home from a predetermined facility;
        acquire position data indicating a position of a user apparatus from each of the user apparatuses owned by each of the plurality of first users;
        check the acquired position data against each of the stored action model corresponding to each of the plurality of first users;
        determine whether a degree of match between the transition of the position of each of the plurality of first users and an action pattern of each of the plurality of first users defined by the stored action model is greater than a threshold;
        estimate each of a plurality of third users owning each of the user apparatuses transmitted the checked position data to start moving in a predetermined period of time in a case where the degree of match is greater than the threshold;
        specify the estimated plurality of third users, as the plurality of first users;
        determining an upper limit number of the plurality of second users to be selected, based on an acceptance probability that is a probability of the plurality of second users accepting the proposal;
        assign autonomous vehicles to respective users of the plurality of second users associated with the at least one of the apparatuses that transmitted the response to the transmitted message;
        generate an operation command for each of the assigned autonomous vehicles;
        transmit the generated operation command to each of the assigned autonomous vehicles; and
        control an operation of each of the assigned autonomous vehicles.

* * * * *